United States Patent
Kiesling

[11] 3,815,352
[45] June 11, 1974

[54] MERCURY CIRCUIT CLOCK
[75] Inventor: Casper Kiesling, Glendale, N.Y.
[73] Assignee: Lawrence Peska Associates, Inc., New York, N.Y.
[22] Filed: Sept. 11, 1973
[21] Appl. No.: 396,319

[52] U.S. Cl............................. 58/23 R, 58/144
[51] Int. Cl........................... G04c 3/00, G04f 1/06
[58] Field of Search......... 58/23 R, 144; 340/239 R, 340/244 C; 307/118

[56] References Cited
UNITED STATES PATENTS
| | | | |
|---|---|---|---|
| 2,279,121 | 4/1942 | Kistler | 58/144 |
| 2,779,015 | 1/1957 | Walker et al. | 340/244 CX |
| 3,665,209 | 5/1972 | Webb et al. | 307/118 |
| 3,707,842 | 1/1973 | Spivak | 58/144 |

Primary Examiner—George H. Miller, Jr.

[57] ABSTRACT

A time indicating device, particularly a mercury-circuit clock.

7 Claims, 2 Drawing Figures

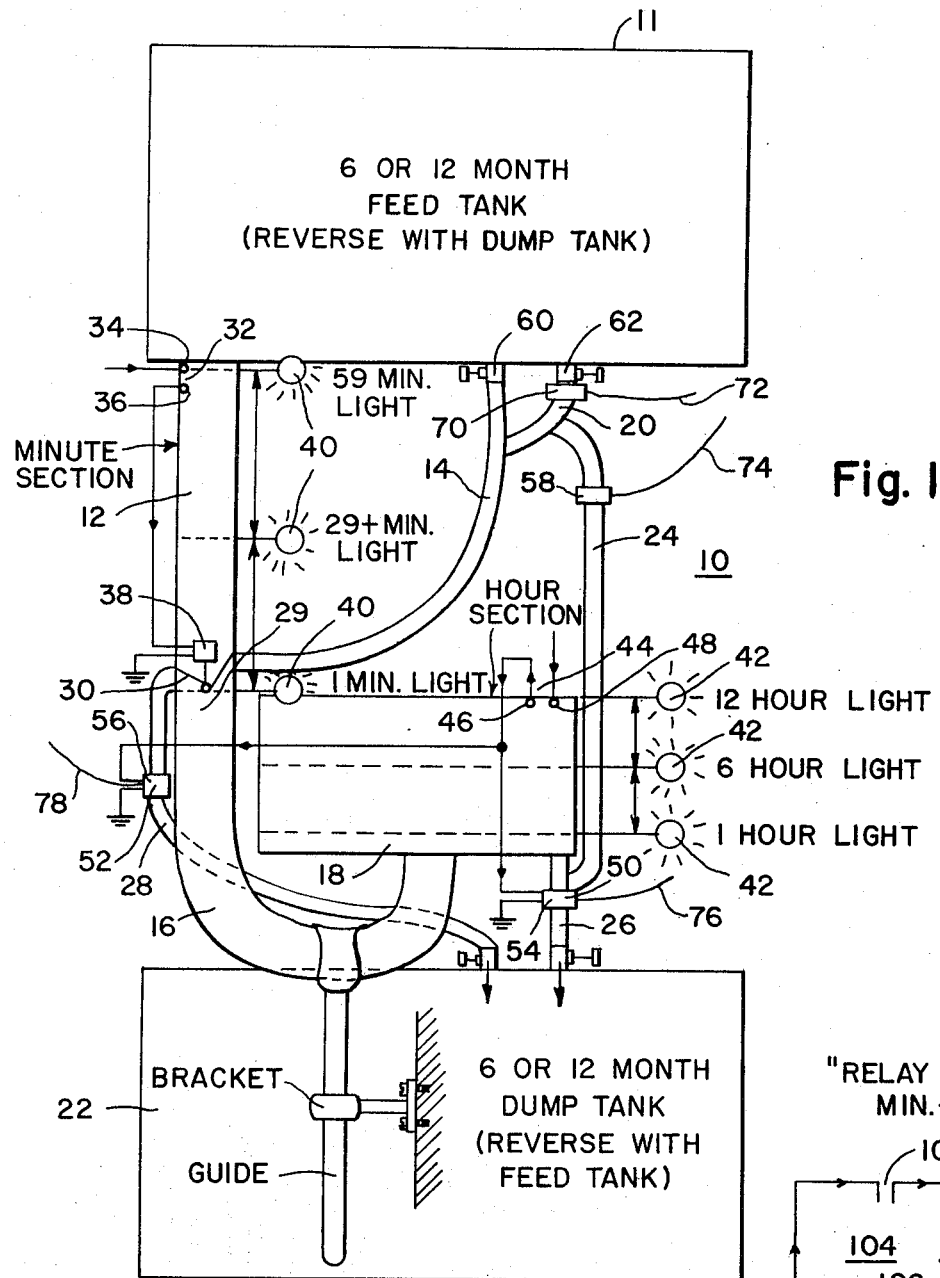
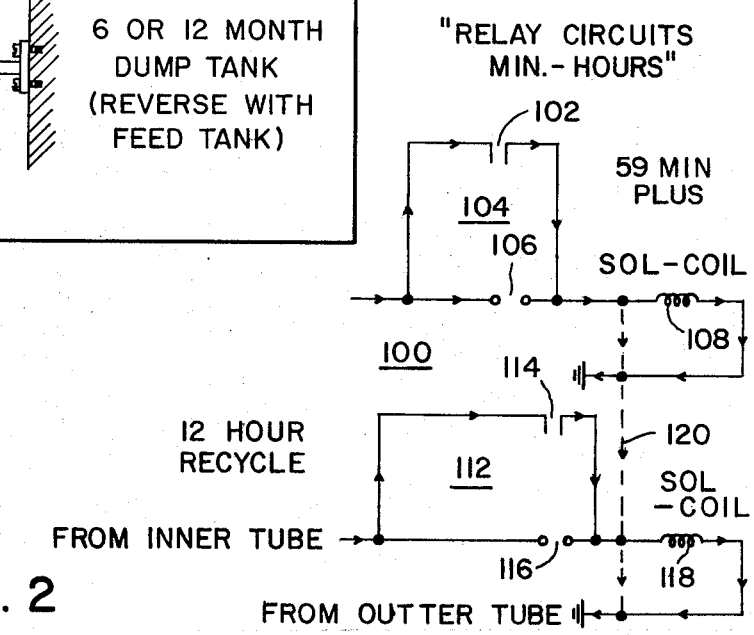

MERCURY CIRCUIT CLOCK

Briefly, the invention comprises a reservoir, or feed tank, containing an electrically conducting fluid, preferably mercury; a drain, or dump, tank, the relative positions of the tanks preferably being interchangeable; conduits between and interconnecting the tanks, control means for regulating the fluid flow; and first and second chambers intermediate the feed and drain tanks, the first and second chambers receiving the fluid and serving to indicate time.

FIG. 1 is a schematic representation of apparatus of the present invention.

FIG. 2 is a schematic representation depicting the apparatus of the present invention in a further preferred embodiment.

In one embodiment of the present invention apparatus 10 (FIG. 1), a feed tank 11 communicates with a first chamber 12 via a first conduit 14, which preferably has an orifice of small cross-sectional dimension. The first chamber 12 communicates with a generally U-shaped conduit 16 that leads to a second chamber 18 that is larger than the first chamber 12. The first and second chambers 12 and 18 respectively are used for indicating minutes and hours. The top of the second chamber 18 preferably is at the same level at or below the bottom of the first chamber 12. The feed tank 11 can communicate with the first conduit 14 by means of a second conduit 20, and with a dump, or storage tank 22 by means of a third conduit 24 that leads to a fourth conduit 26 that also interconnects the second chamber 18 and the dump tank 22. The first chamber 12 also communicates with the dump tank 22 via a fifth conduit 28.

The first chamber 12 includes a solenoid operated two-way valve 30 that opens and closes both the first conduit 14 and the passageway 29 between the first chamber 12 and the U-shaped conduit 16. The first chamber 12 also includes an open switch 32, e.g. two open, or unconnected, terminals 34 and 36, one such terminal 36 being connected to the solenoid 38 regulating the valve 30. The switch 32, and the circuit in which it is located, is closed by conducting fluid, e.g., mercury, rising in the chamber 12 to the level of the terminals 34, 36, as described below. The first chamber 12 is of such volume as to receive and hold a volume of mercury equal to the total amount flowing, via first conduit 14, from the feed tank 11 in a period of up to about 59 minutes, for example, thereby permitting the first chamber 12 to act as a minute indicator. The first chamber 12 includes a number of lights 40, e.g. 59 in number (only a few being illustrated for the sake of simplicity) extending, at the outside of the chamber 12 between the ends of the chamber 12 and being wired such that they turn on (or off) in sequence as the mercury level rises in the first chamber 12 to short-circuit, or close, their respective switches (not shown) inside the chamber 12.

The second chamber 18 has such a volume as to permit it to receive and hold a volume of mercury equal to the total amount flowing, in twelve hours, for example, from the feed tank 11 to the first chamber 12 via the conduit 14. The second chamber 18 has e.g., 12 lights 42 (only a few lights being illustrated for the sake of simplicity) extending at the outside of and between the ends of the chamber 18, these lights being wired so as to turn on (or off) in sequence as the mercury level rises in the chamber 18 to short-circuit their respective switches and each light 42 being used to indicate a different hour in a 12 hour span.

A second switch 44 (two open terminals 46 and 48) is located in the second chamber 18, the switch 44 and the circuit containing it being closed when the mercury level rises in the chamber 18 to the level of the terminals 46, 48. Solenoids 50 and 52 that respectively operate valves 50 and 52 located in, respectively, conduits 26 and 28, are in the circuit containing, and are controlled by, the second switch 44. The valves 54 and 56 can also be manually operable, as are a valve 58 in the third conduit 24 and valves 60 and 62 in, respectively, the first and second conduits 14 and 20 for controlling the mercury flow from the feed tank into these conduits 14 and 20. The tanks 11 and 22 preferably are provided with heating means to maintain the mercury at about 70° F to ensure adequate flow.

In the operation of the apparatus 10, conductive fluid (not shown) preferably mercury, is provided in the feed tank 11 and permitted to flow (valve 60 open) through the conduit 14 into the first chamber 12, valve 30 being open to the conduit 14 but closed to the passageway 29 so that the fluid accummulates in the chamber. As the fluid flows into the chamber 12, electrical connection is made sequentially to and turns on the lights 40, which are separately switchable. The rate of fluid flow into the chamber and the spacing of the electrical contacts for the lights is, in this embodiment, such that the lights are turned on seriatim at one minute intervals, thus providing a minute-measuring timer. When the fluid level reaches the terminals 34 and 36 of switch 32, the switch is closed so that electrical energy is provided to solenoid 38, which, in turn, opens the valve 30 to the passageway 29, so that fluid drains into the second chamber 18 via the U-shaped conduit 16, with the conduit 14 closed.

It is preferred that there be 59 such minute lights and that the first chamber 12 be emptied of fluid in about 1 minute, so that an hour light associated with the second chamber 18 is turned on after a 60-minute period, as described below.

When the fluid from the first chamber 12 is emptied into the second chamber 18, a switch (similar to switch 32) is reached by the fluid level and is closed so that electrical energy is provided to one of the hour lights 42 associated with the second chamber 18, turning on the light.

The fluid having been drained from the first chamber 12, the valve 30 operated in the solenoid switch 38 closes the passageway 29 and fluid again is accummulated in the chamber 12 and the above process is repeated, with the next hour light of the apparatus subsequently being turned on when the chamber 12 is again emptied into chamber 18.

When the fluid level in the second chamber 18 reaches the switch 44 (i.e., when the 12 hour light is turned on), the switch 44 is closed so that electrical energy is provided to the solenoids 50 and 52, connected therewith which solenoids, in turn, open the valves 54 and 56 respectively, thus permitting the chambers 12 and 18 to be drained into the storage, or dump, tank 22 via conduits 26 and 28.

This sequence is continued, the dump tank accumulating fluid and the feed tank being depleted of fluid. The time over which the apparatus can be operated in the above manner varies with the fluid-holding capacity of the feed and storage tanks 11 and 22. It is preferred that these tanks have sufficient capacity to permit such operation for a time on the order of 6 months or a year.

The apparatus of the invention preferably is invertable so that the tank previously utilized as a storage or dump tank (i.e., tank 22) can, on being filled with fluid, have its position interchanged with the tank previously utilized as a feed tank (i.e., tank 11), so that the former now serves as a feed tank and the latter as a dump or storage tank. In order to do this, a second set (not shown) of conduits, minute and hour chambers (or, if desired, the same minute and hour chambers as previously used but with suitable modification), and valves duplicating those shown in FIG. 1 but oppositely oriented (i.e., the second set is inverted as to the corresponding parts shown in FIG. 1).

When the respective positions of the feed and storage tanks are interchanged, conduit 14 and the flood lines or conduits 20 and 24, are closed by the valves 60 and 62, respectively (after the tank 11 has been emptied of fluid), the closing of these conduits avoiding the unintentional flow of fluid into the tank 11 that is to be used as a storage tank. Other valves (not shown for simplicity) are opened to permit fluid to flow in a controlled manner as described above between the new feed tank (tank 22) which is now located above the storage tank (tank 11) after the tanks have been interposed. In the manner described above, the minute chamber would be filled and then emptied into the hour chamber, both then being emptied in the storage tank and then this cycle is repeated.

Where it is desired to re-set the apparatus 10 (FIG. 1) manually, the flood lines or conduits 20 and 24 are opened independently of each other, as by opening the valves 70 and 58 by means of cords 72 and 74, respectively (these valves being manually controllable). Also, re-setting of the apparatus 10 can be attained by opening valves 54 and 56 by means of cords 76 and 78, so as to empty the minute and hour chambers 12 and 18.

In another embodiment of the invention (schematically shown in FIG. 2), the apparatus 100 includes a first switch 102 (similar to switch 32 in FIG. 1) at the upper parts of the minute-indicating chamber 104 (e.g., 12 in FIG. 1) and a second switch 106 at the lower parts of the chamber, the switches 102 and 106 being connected to a solenoid 108 (similar to solenoid 38 in FIG. 1) that controls a valve that serves to control influx of fluid into the chamber from a reservoir and to retain fluid (mercury) in the minute-indicating chamber (when the valve is closed to a passageway leading to another chamber) and to permit fluid to be drained from the chamber 104 when the valve is opened. The hour-indicating chamber 112 (e.g., similar to 18 in FIG. 1) is similarly constructed, having a first switch 114 at its upper parts and a second switch 116 at its lower portions and a solenoid 118 (similar to solenoid 50 in FIG. 1) that controls a valve (e.g., 54 in FIG. 1), the valve being opened by the first switch 114 (when the fluid level reaches the switch 114) to drain the hour chamber, the valve in a closed position allowing fluid to be accummulated in the hour-indicating chamber 112. The activation of the solenoids by the switches 102 and 114 thus opens the valves and permits fluid to be dumped from the chambers but once the fluid level falls below the upper switches, no electrical energy is provided to the solenoids, thereby permitting the valves to close and thwarting the effort to drain the chambers. To avoid this problem, the lower switches 106 and 116 are provided, so as to provide, with the conducting fluid in the chambers, an electrically conducting path to the solenoids, permitting them to remain open for the duration of the draining operation. However, once the chambers have been drained and the valves closed (because complete drainage of the fluid opens or breaks the circuits to the solenoids), a new quantity of fluid is introduced into the minute indicating chamber (e.g., via conduit 14 in FIG. 1), which can activate the switches 106 and 116 so that the valves associated with these switches 106 and 116 are unintentionally opened and the fluid is prematurely emptied from the minute and hour indicating chambers before the expiration of the time necessary to fill those chambers.

To overcome this problem, a shunt line or conduit 120 of relatively small cross-section is connected to a source of the fluid (e.g., the feed tank 11 or the conduit 14 in FIG. 1) and (while fluid is fed to the minute chamber) carries a small portion of fluid to the electrical conductors of the solenoids 108 and 118 so as to short-circuit first the solenoid 108 and then solenoid 118 and thereby prevent the premature opening of the valves and chamber drainage. Once the normal timing is begun, the shunt line, or conduit, 120 is emptied of the fluid and is prepared for the next timing cycle.

While time units of minutes and hours have been used for illustration, others can be used with equally satisfactory results.

Having herein described the invention, what is claimed as new is:

1. A time indicating apparatus, comprising: (a) reservoir means containing an electrically conducting fluid; (b) a first chamber communicating with said reservoir; (c) first time unit-indicating elements associated with said first chamber and electrically activatable in sequence by means comprising said fluid provided in said first chamber from said reservoir; (d) a second chamber communicating with said first chamber; (e) means for regulating the flow of fluid from said first chamber to second chamber, said means comprising switching means for putting said first and second chambers in communication with each other at predetermined intervals; and (f) second time unit-indicating elements associated with said second chamber and electrically activatable in sequence by means comprising said fluid provided in said second chamber from said first chamber, said second time unit being greater than said first time unit.

2. A time indicating apparatus as in claim 1, comprising a U-shaped first conduit element connecting said first and second chambers, said second chamber being located below said first chamber.

3. A time indicating apparatus as in claim 1, wherein said regulating means comprises an open first switch located in said first chamber and being closable by contacting said fluid therein and a valve regulating the flow of said fluid from said reservoir into said first chamber and from said first chamber into said second chamber, said valve being controlled by said first switch.

4. A time indicating apparatus as in claim 1, comprising a third conduit connecting said first chamber and said storage tank and valve means on said third conduit for regulating fluid flow from said first chamber to said storage tank, said valve being controlled by said second switch.

5. A time indicating apparatus as in claim 1, further comprising third and fourth chambers communicating with each other, said third and fourth chambers respectively comprising time unit indicating elements electrically activatable in sequence by respective means comprising said fluid provided in said third and fourth chambers; means for regulating the flow of said fluid from said third chamber to said fourth chamber; storage means for receiving said fluid from said first and second chambers; and conduit means connecting said first and second chambers with said storage means so as to transfer said fluid thereto from said first and second chambers, wherein the respective positions of said reservoir means and said storage means are interchangeable such that said reservoir and storage means can alternately communicate with said first and second chambers, and said third and fourth chamber.

6. A time indicating apparatus as in claim 1, further comprising an open second switch located in said second chamber and being closable by contacting said fluid therein, a fluid storage tank, a second conduit connecting said second chamber and said storage tank, a third conduit connecting said first chamber and said storage tank, first valve means at said second conduit for regulating the flow of said fluid from said second chamber to said storage tank, second valve means at said third conduit for regulating the flow of said fluid from said first chamber to said storage tank, said first and second valve means being controlled by said second switch and permitting said fluid to be transferred from said first and second chambers to said storage tank when said fluid level reaches said second switch.

7. A time indicating apparatus as in claim 6, further comprising first and second solenoid means respectively controlling said first and second valve means said solenoid means both being controlled by said second switch, said apparatus comprising a first conduit betweeen said reservoir means and said first chamber and comprising a fourth conduit between one of said reservoir means and said first conduit, and said solenoid means, whereby said first and second solenoid means can be short circuited at predetermined intervals.

* * * * *